Jan. 12, 1960  F. TOTZEK  2,920,945
PROCESSES FOR THE PRODUCTION OF COMBUSTIBLE GASES
Filed July 9, 1952
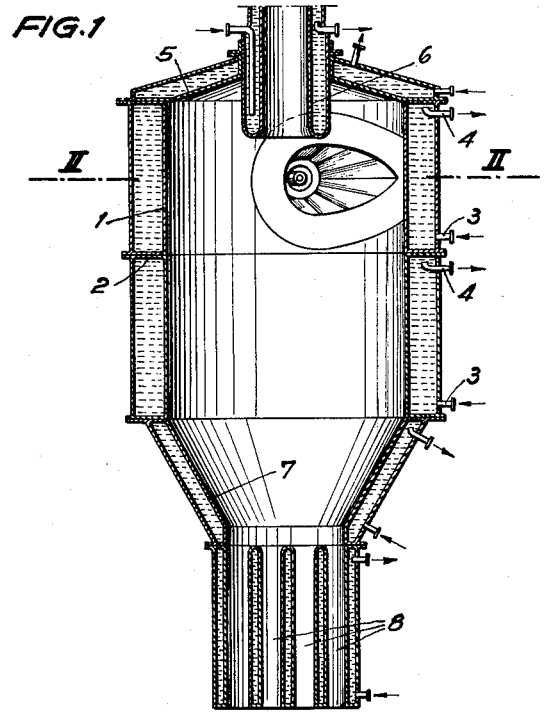
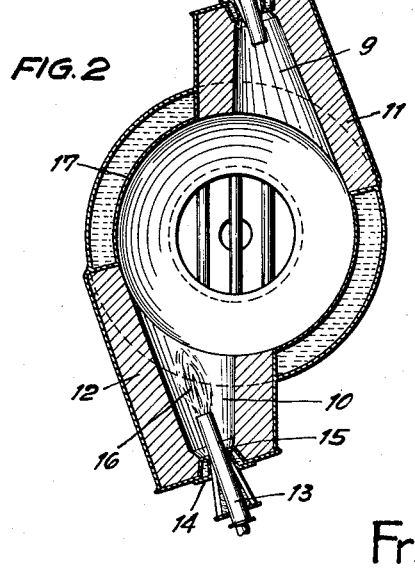
INVENTOR
Friedrich Totzek
by United States Patent Office 2,920,945
Patented Jan. 12, 1960

2,920,945

PROCESSES FOR THE PRODUCTION OF COMBUSTIBLE GASES

Friedrich Totzek, Essen-Bredeney, Germany, assignor by mesne assignments, to Koppers Company, Inc., Pittsburgh, Pa., a corporation of Delaware Application July 9, 1952, Serial No. 297,965

Claims priority, application Germany July 13, 1951

3 Claims. (Cl. 48—206)

The invention relates to improvements in process and apparatus for the production of gases, i.e. gases containing hydrogen and carbon monoxide, by the reaction of finely divided, and more particularly solid, fuels in suspension with oxygen and endothermically reacting gasifiication media such as steam or carbon dioxide, wherein a preferred mixture of fuel and gaseous gasification media as the carrier gas is injected in cocurrent flow into a straight line of flow reaction chamber maintained at elevated temperature. In such process a stream of oxygen is preferably used to inject the fuel, and in some cases a mixture of oxygen and an endothermically reacting gasification medium e.g. steam.

The present invention is a continuation in part of my U.S. Patent 2,670,280 of February 23, 1954, filed August 12, 1948, and U.S. Patents 2,702,744 of February 22, 1955, and 2,709,152 of May 24, 1955.

The essential problem in such process which the improvement of the present invention overcomes lies in keeping as small as possible the consumption of valuable oxygen (by which is included pure oxygen as well as air of substantially increased oxygen content), that is, increasing as far as possible the quantity of the gas resulting from the endothermic gasification reaction, in which the solid fuel reacts with steam or carbon dioxide.

The basic idea of the invention consists in passing the mixture to be reacted first of all through the straight line of flow reaction chamber in a substantially straight line flow whilst the oxidizing and exothermic gasification takes place, and subsequently creating a relative movement between the solid and the gaseous fractions after they leave the oxidising zone in the straight line of flow reaction chamber, by laterally diverting the flow of reaction media in a cyclic reaction chamber in accordance with the rules of the cyclone technique. Through this diversion the solid constituents are centrifuged out from the gas to the walls of the cyclonic reaction chamber and a corresponding retardation of the movement of the solid particles is produced by friction at the wall surfaces, whilst the continuous movement of the gaseous media is practically unretarded.

This cyclonic diversion of the flowing reaction media is carried out before the completion of the endothermic gasification reaction and preferably after the completion of the exothermic reaction of the oxygen with the fuel in the straight line reaction chamber.

A preferred embodiment of the invention consists in effecting the subsequent relative movement of the reaction media during the endothermic reaction by tangentially introducing the media coming in a straight-line flow from the exothermic oxidising zone of the straight line reaction chamber, into a cyclone chamber into which the zone of movement of the oxidising zone are subjected to centrifugal force throwing the solid particles radially of the cyclonic gas flow.

In practice the invention may advantageously be carried out by arranging tangentially on a cyclone reaction chamber one or more preferably conically tapering straight line of flow reaction chambers which at their wider ends open into the cyclone chamber, and in which the reaction media enters at the smaller end thereof.

The gases are withdrawn centrally from the cyclone-like reaction chamber.

It is advantageous to make the straight line of flow reaction chambers, in which the exothermic oxidising reaction takes place, of poor heat conducting refractory material, so that a high temperature is produced in these reaction chambers. This has the result, which is particularly important for the gasification of solid fuels, that the fuel is quickly heated therein to a high temperature which facilitates the later endothermic gasification reaction.

The cyclone reaction chamber in which the endothermic gasification reaction is to be terminated whilst drawing off the stream of the reaction media, may if desired be formed of cooled wall surfaces, for example in the form of a double jacket provided with water cooling.

It has been shown that by such a cooling the conclusion of the completion of the endothermic gasification reaction is substantially unaffected, since for such conclusion it is chiefly a question of maintaining the fuel residue in contact with the gasification media for a sufficiently long time and producing a strong relative movement between the media.

The solid fuel to be treated is advantageously employed in the form of a fine powder. From this powder a highly homogeneous mixture is made with oxygen and in some cases other gasification media, so that the fuel dust is suspended in the gaseous gasification media. The mixture is injected through watercooled nozzles with a suitable speed of flow into the reaction chamber, kept at elevated temperature, and is there ignited.

In the accompanying drawing there is illustrated an apparatus suitable for carrying out the process according to the invention and Fig. 1 shows a vertical section of the apparatus and Fig. 2 shows a horizontal section on the line II—II of Fig. 1.

The apparatus illustrated on the drawing comprising a cyclone chamber with a cylindrical housing 1 which is constructed as a double jacket through which the cooling water can be passed. The casing of the housing 1 is divided by intermediate partitions 2 into various cooling zones to which the coolant is supplied by pipes 3 and from which the coolant flows away through pipes 4.

The cover 5 is constructed in a similar way to the wall 1 of the housing and has arranged therein a water cooled gas outlet pipe 6 which extends into the chamber space in the interior of the cyclone housing 1. The gas outlet pipe 6 lies in the axis of the cyclone housing and serves for the withdrawal of gases from the housing.

At the base there is connected to the housing 1 a similarly water-cooled conical base 7 which continues into a series of narrow passages 8, through which the unreacted solid fuel residue centrifuged out from the gas can be withdrawn from the cyclone. The passages 8 are formed of water-cooled walls.

The conical straight line of flow reaction chambers 9 and 10 open tangential into the cyclone reaction chamber space in the interior of the upper part of the housing 1. These are formed of fireproof brickwork 11 and 12. At the tapered narrower outer ends of each of the straight line of flow reaction chambers 9 and 10 there opens an inner axial water-cooled nozzle 13, which forms with a tubular body 14 and outer annular nozzle 15.

The inner nozzles 13 serve to introduce axially into the straight line of flow reaction chambers a highly homogeneous mixture of the fuel dust with oxygen in the form of a jet.

The mixture ignites axially in the straight line of flow reaction chambers 9 and 10 which are kept at high temperature, and forms near the inner end of the nozzles 13 a more or less pear shaped exothermic oxidizing reaction zone, as indicated at 16 in the chamber 10.

The endothermically reacting gasification medium, for example steam, is introduced through the outer annular nozzles 15, so that the exothermic oxidizing reaction zones 16 are surrounded on all sides by a practically continuous veil of steam.

The straight line of flow reaction media leave the reaction chambers 9 and 10 in a substantially parallel straight-line flow. The streams enter the cyclone chamber tangentially and meet the wall parts extending transversely to the direction of flow of the media issuing from the reaction chambers 9 and 10, the flow from the reaction chamber 10 thus tangentially encountering approximately the zone indicated at 17 in Fig. 2. The straight line streams of the reaction media are laterally deflected and tangentially undergo a circulating movement which cyclonically produces a relative radial movement of the solid constituents in the gas stream to the walls of reactor 1 due to the centrifugal force.

Insofar as the solid bodies are by this relative movement brought into contact with the walls of the cyclone housing 1, the speed of the solid bodies is still further reduced by friction and thereby the relative movement is increased.

As a result of the greater contact due to the aforesaid combined acceleration in relative movements, the reaction between the residual fuel and the endothermically reacting gasification media is thereby considerably increased and therefore the yield of the gasification of the carbon content of the fuel is considerably increased. The following example shows the technical advance which is achieved by the invention.

It will be assumed that 1 kg. of coal dust is reacted in suspension with oxygen and endothermically reacting gasification media according to the method of gasification generally employed hitherto. For this purpose 0.593 Nm.$^3$ of oxygen (95%) and 0.726 kg. of steam are added. There is obtained 2.1192 Nm.$^3$ of water-gas with a lower heating value of 2420 kcal./Nm.$^3$. 83% of the carbon content of the fuel dust is consumed.

If, however, the process according to the invention is followed, for example in the apparatus illustrated, then, with the same consumption of coal dust, oxygen and steam, 2.4462 Nm.$^3$ of water gas with a lower heating value of 2450 kcal./Nm.$^3$ are obtained and 93% of the carbon content of the fuel dust is reacted.

In individual cases the degree of the reaction depends substantially on the reactivity of the fuel dust and its distribution. However, in any case a substantial improvement in the reaction is obtained by the employment of the combined straight line and cyclone method of operation according to the invention, compared with the methods of operation previously suggested.

In some cases the cyclone housing which serves for the after-reaction, in which the diversion of the gas stream takes place, need not be provided with a cooling casing. It is also possible to make the cyclone housing wholly or partly of refractory wall surfaces. In some cases it may also be advantageous to introduce gaseous reaction media, particularly endothermically reacting media, separately into the after-reaction cyclone chamber, in order to improve further the desired reactions therein. In this case it may be advantageous to preheat the media before entry into the after reaction cyclone chamber.

The number of the primary reaction straight line of flow chambers tangentially joined to the after-reaction cyclone chamber may also be greater than two. It is also possible to arrange the primary reaction straight line of flow chambers at different heights and if desired to also let them discharge with a certain inclination to the horizontal, whereby the circulatory movement of the centrifuging gases in the after-reaction cyclone chamber may be favourably influenced.

I claim:

1. A process for the production of a gas containing carbon monoxide which comprises forming a suspension of a finely-divided solid carbonaceous fuel in a free-oxygen-containing gas at a temperature below the ignition temperature of said fuel in such proportion that only a part of said fuel will react exothermically with the oxygen of said gas, introducing said suspension as a jet axially into a preliminary straight line of flow reaction chamber maintained at a temperature above the ignition temperature of said fuel, thereby subjecting said part of said fuel to combustion, injecting peripherally of said jet along the wall of said preliminary straight line of flow reaction chamber in a direction cocurrent with the direction of flow of said jet, an annular stream of an endothermic gasifying agent, flowing the stream of partial combustion products and unconsumed fuel and the stream of endothermic gasifying agent to pass in a generally straight line through said preliminary reaction chamber and then causing said streams to mix by discharging the stream from said straight line of flow chamber tangentially into a cyclone chamber and centrifuging the steam therein to complete the reaction of said constituents to carbon monoxide thereby by the heat carried over in the stream from the straight line of flow chamber, withdrawing the stream of complete gas reaction products axially from the cyclone chamber, and separately withdrawing from said cyclone chamber the residual solids centrifuged from the gas therein.

2. The process of claim 1 in which the endothermic gasifying agent is steam.

3. The process of claim 1 in which the endothermic gasifying agent is carbon dioxide.

References Cited in the file of this patent

UNITED STATES PATENTS

| | | |
|---|---|---|
| 798,312 | Wrinkle | Aug. 29, 1905 |
| 1,718,830 | Nielsen et al. | June 25, 1929 |
| 1,924,856 | Heller | Aug. 29, 1933 |
| 2,357,301 | Bailey | Sept. 5, 1944 |
| 2,530,077 | Ramsing | Nov. 14, 1950 |
| 2,605,174 | Krejci | July 29, 1952 |
| 2,655,443 | Moore | Oct. 13, 1953 |
| 2,656,264 | Yellott | Oct. 20, 1953 |
| 2,677,603 | Van Loon | May 4, 1954 |
| 2,878,110 | Altstead | Mar. 17, 1959 |

FOREIGN PATENTS

| | | |
|---|---|---|
| 338,108 | Great Britain | Nov. 3, 1930 |
| 659,379 | Great Britain | Oct. 24, 1951 |

OTHER REFERENCES

"Industrial and Engineering Chemistry," April 1948, received for publication Oct. 31, 1947, pages 567 to 569 and 582.